United States Patent [19]

Larsen et al.

[11] 4,325,192

[45] Apr. 20, 1982

[54] APPARATUS FOR DISSICANT DRYING AND CONVEYING OF A GRANULATE AND A VALVE MEANS PREFERABLY FOR USE WITH SAID APPARATUS

[75] Inventors: Poul Larsen, Elsinore; Hans B. Jochumsen, Frederikssund, both of Denmark

[73] Assignee: Lejbolle Maskinfabrik APS, Tranekaer, Denmark

[21] Appl. No.: 201,063

[22] PCT Filed: Dec. 18, 1979

[86] PCT No.: PCT/DK79/00060

§ 371 Date: Aug. 13, 1980

§ 102(e) Date: Aug. 13, 1980

[87] PCT Pub. No.: WO80/01315

PCT Pub. Date: Jun. 26, 1980

[30] Foreign Application Priority Data

Dec. 19, 1978 [DK] Denmark ............................ 5707/78

[51] Int. Cl.³ .............................................. F26B 15/08
[52] U.S. Cl. ............................................ 34/80; 34/169
[58] Field of Search ................... 34/80, 77, 191, 169, 34/54

[56] References Cited

U.S. PATENT DOCUMENTS

| 2,311,824 | 2/1943 | Gautreau. |
| 2,364,697 | 12/1944 | Daniels ........................ 137/625.28 |
| 2,871,574 | 2/1959 | Thies. |
| 3,621,585 | 11/1971 | Robertson ............................. 34/80 |
| 3,972,129 | 8/1976 | Graff .................................... 34/80 |

FOREIGN PATENT DOCUMENTS 507528 9/1930 Fed. Rep. of Germany.
1375/73 3/1973 Fed. Rep. of Germany.
2455335 5/1976 Fed. Rep. of Germany.

OTHER PUBLICATIONS

"Dry-Air Dehumidifying Hopper Dryer Systems", brochure.
"Engineering Data" No. 919 by Conair, Inc.
"Continator" by Laboratorie Teknik.
"Interplas 77" by Laboratorie Teknik.
"Plastics Dryers and Preheaters" by Conair.

*Primary Examiner*—Larry I. Schwartz
*Attorney, Agent, or Firm*—Oblon, Fisher, Spivak, McClelland & Maier

[57] ABSTRACT

An apparatus for preheating and drying a granulate (43) comprises an inlet (61), a discharge (3a, 3b), a blower (10), air guide pipes (9, 15, 16, 19, 23, 24, 25, 31), a valve (11), and a heater. For creating three air circuits, an adjustable, multiport valve and a reversible blower (10) are provided. In each position, air from the blower passes in two directions through said multiport valve (11). The apparatus comprises a heat accumulator (161). The first circuit dries the granulate (43), the second circuit regenerates a humidity adsorbing material, and the third circuit transports material to the drier. The accumulator (161) preheats air during the regeneration, re-uses accumulated heat from said regeneration during the granulate drying cycle. The multiport valve is adjustable to various positions, gas in each position being directed along two paths through the valve. The valve comprises two manifolds (13, 14) with hubs (131, 133, 134, 135, 141, 142, 143) leading to opposing orifices (131b, 131c, 132b, 133b, 134b, 135b). An apertured disc is rotatably located between the manifolds.

4 Claims, 10 Drawing Figures

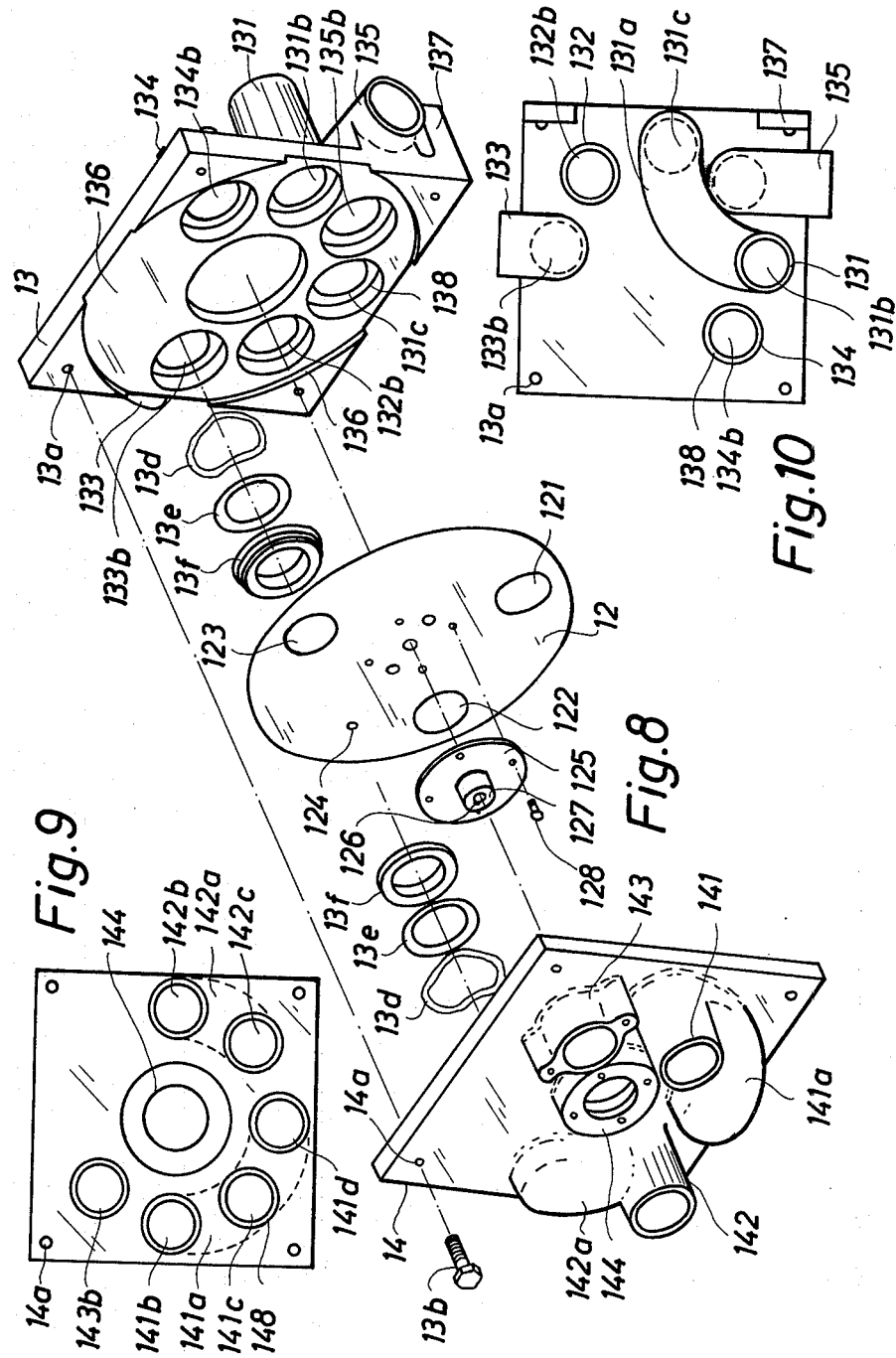

APPARATUS FOR DISSICANT DRYING AND CONVEYING OF A GRANULATE AND A VALVE MEANS PREFERABLY FOR USE WITH SAID APPARATUS

TECHNICAL FIELD

The present invention relates to an apparatus for preheating and drying a granulate or a granulated material, which apparatus is constructed to be connectable with the material inlet of a plastic processing machine, and which comprises a drier for plastics with a material inlet connected to a stock of material and a material discharge connected indirectly or directly to the material inlet of the plastic processing machine, as well as a blower, air guide pipes, a valve means, and a heating member.

Background Art

A known apparatus of this type comprises a drier for plastics on top of which there is mounted a hopper for feeding plastic material into the drier for plastics by means of for example a vacuum conveyor, thereby giving the known drier for plastics an additional height. A transportable, automatic air drier is by means of flexible tubes connected to the top and the bottom of the drier for plastics. The automatic air drier contains a number of desiccant cartridges rotatably mounted between two air manifolds. In a first circuit air is blown by means of a first blower through a selected one of the cartridges through one of the tubes leading to the bottom of the drier for plastics, up through the granulate, and back through the other tube to the bottom of the selected cartridge. When this cartridge is saturated with moisture, the circulation is stopped and another cartridge is placed in the right position, whereafter the drying of the plastics continues. Thereupon this moisture saturated cartridge is connected to a second circuit with a second blower and a heating unit for heating fresh air by means of which circuit the cartridges are regenerated for a period of time, whereupon the cartridge is cooled in a subsequent longer period before it is re-used for drying the plastic material. This unit has thus three completely independent circuits, one for transporting material, one for drying, and one for regenerating, each with its own driving unit. It is consequently costly, volominous, and not suited to be placed as a single unit on top of a processing machine, and there are no possibilities of re-using the heat used for the regeneration.

Other apparatus for drying granulated material use heated and possibly dried fresh air, which systems consume much energy and need frequent regeneration of the desiccant beds.

Disclosure of Invention

It is the object of the present invention to provide an apparatus of the above-mentioned type and which avoids the above-mentioned defects, and has a compact construction with few movable parts and only a single driving unit for creating three different air circuits, thereby providing an apparatus of such a height and volume that it may be placed on top of the processing machine for plastics, and which in addition thereto is less energy consuming than hitherto possible.

This object is accomplished by an apparatus of the type mentioned in the first paragraph being characterised in that the blower is reversible and that the valve means is a multiport valve constructed to be adjusted to three operational positions, whereby air driven by the blower in each of said operational positions may pass in two directions through said valve, which creates a differing air circuit in each position, and is able to be adjusted to a fourth closed position, and that it comprises an air drier and preferably a heat accumulator. By this means all parts for driving an apparatus for drying and preheating a granulate such as for instance granulated plastics can be combined into a single compact unit of less height and smaller volume than for existing compatible apparatus, thereby saving material, shortening the connections, and saving energy.

This has been made possible by having only a single reversible blower and a single valve means to guide the air stream from the blower in a first circuit for drying the plastic material, in a second circuit regenerating the adsorbing material, and in a third circuit transporting the raw material to the drier for plastics, the heat accumulator making it possible to re-use heat generated during the drying of plastic material to be used for preheating air during the regenerating cycle and to accumulate the heat created in the adsorbing mass during the regeneration cycle for use during the plastic drying circuit accumulating part thereof so that a plastics drying cycle may be started quickly after the regenerating cycle.

It is furthermore the object of the present invention to provide a valve which is preferably constructed for use in connection with the apparatus described above, but which also may be used where there is a need for creating various air circuits by means of a single or several blowers or sources for compressed air. Such a valve is characterised by said valve being a multiport valve adjustable for a number, preferably three or more, of operational positions, whereby air or gas in each operational position may be directed in at least two directions through said valve, thereby creating a circuit at variance with the remaining circuits in each position.

Other advantages are evident of the following description based upon the drawings.

BRIEF DESCRIPTION OF DRAWINGS

Preferred embodiments of the apparatus according to the invention will be described below with reference to the accompanying drawings, in which FIG. 8 is an exploded view of the turntable valve, FIG. 9 illustrates the outer side of a first manifold of the turntable valve, and FIG. 10 illustrates the inner side of a second manifold of the turntable valve.

BEST MODE FOR CARRYING OUT THE INVENTION

Figure 1:
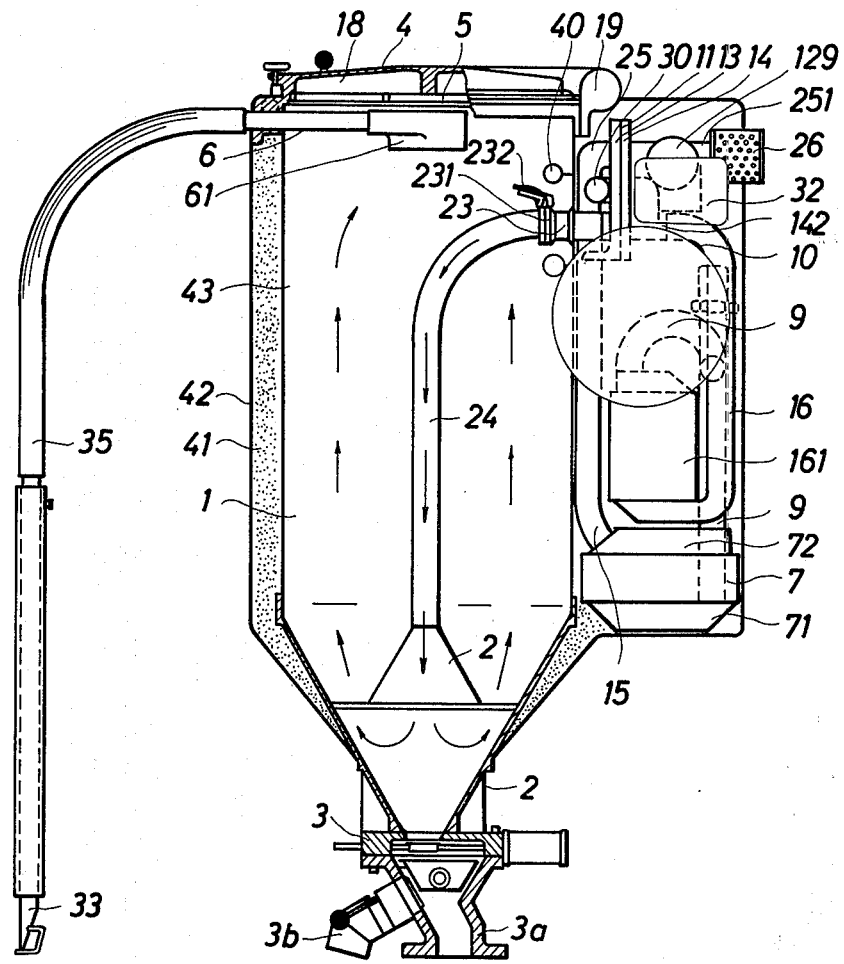
FIG. 1 is a side view partly in section of a preferred embodiment of the apparatus according to the invention.

Although various embodiments are illustrated in the drawing, the reference numerals refer to the same parts in all the Figures.

The apparatus comprises a drier 1 for plastics shaped as an upright, double walled, insulated, cylindrical container. At the bottom this container forms a hopper 2 and is connected to a slide valve 3. Through a socket 3a with a passage for granulate comprising a discharge valve 3b, this hopper is adapted to be secured on a plastic processing machine, cf. the dotted lines in FIGS. 4 to 7, in such a manner that the content in the drier 1 may slide immediately downwards into the inlet opening of the machine for processing the plastic material. At the top the container is closed by a lid 4, and a short distance under the lid a working filter 5 is provided. Under the working filter 5, an inlet pipe 6 for granulated or pulverized material is provided. The pipe 6 ends in a distributor cyclone 61 opening downwards, and outside the container 1 said pipe is connected to a stock of granulated plastic material, said material being sucked from said stock into the drier 1 for plastics. The drier 1 is vacuumproof and connected at the bottom to the plastic processing machine through the socket 3a, cf. FIG. 1.

Beside the drier 1, a second container 7 is present, the interior of which forms an air drier, which is filled with a humidity adsorbing material 8 such as for instance molecular sieve, cf. FIGS. 2 and 4 to 7. A lower vertical heating pipe 9 comprising some electric heating elements 91, cf. FIGS. 4 to 7, is led through the container 7, cf. FIGS. 2 and 4 to 7.

Figure 2:
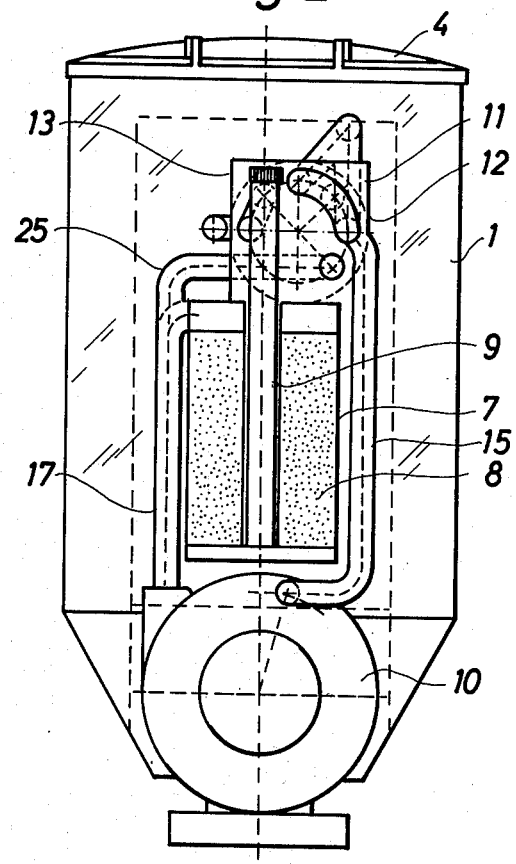
FIG. 2 is a right side view of an alternative embodiment of the apparatus according to the invention.
Figure 3:
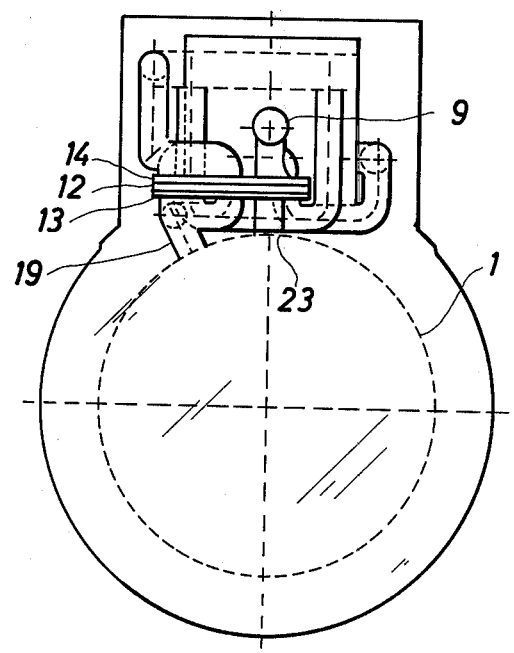
FIG. 3 is a top view of the embodiment illustrated in FIG. 2.

A reversible blower 10 is located under, cf. FIG. 2, or preferably above, cf. FIG. 1, the container 7. The suction side of this blower may be altered to a pressure side and vice versa.

Over the container 7, a multipassage turntable valve 11 is located, cf, especially FIGS. 8 to 10, comprising a valve body in the form of a circular disc 12 rotatable in its own plane about an axis through its centre and situated between two valve box portions or a first and a second manifold 13 and 14, respectively. The valve disc 12 of thin, rigid steel sheet comprises three large circular apertures 121, 122, and 123 as well as a small circular aperture 124. The centres of these apertures are all on a circle having its centre in the axis of rotation of the disc. A hub 125 is secured, e.g. by rivets 128, to the middle of the disc 12 and comprises a passage 127 provided with a slot 126 for passage of a driving shaft (not shown) rotating the disc. The positioning of the valve disc 12 is performed through a driving motor 129 controlled by a control system not described.

In each corner, the first manifold 13 comprises a threaded assembling hole 13a, in which a screw 13b is screwed for assembling said first manifold to the second manifold 14. On the outer side of the first manifold 13, five pipe stubs 131, 132, 133, 134, and 135 are provided, whereby the stub 131 is connected to a distributor pipe 131a opening on the inner side of the manifold 13 on to two circular orifices 131b and 131c. On the inner side of the manifold 13, the stubs 132, 133, 134, and 135 open on to circular orifices 132b, 133b, 134b, and 135b.

On the inner side, the first manifold 13 comprises a circular recess 136, the diameter of which is a short distance greater than the diameter of the disc 12. On the outer side, this first manifold furthermore comprises two assembling lugs 137.

In each corner, the second manifold 14 comprises a smooth assembling hole 14a receiving the screw 13b, and on the outer side said manifold comprises three connecting pipe stubs 141, 142, 143, whereby the stubs 141 and 142 are connected to their respective distributor pipes 141a and 142a. On the inner side of the manifold 14, these pipes 141a and 142a open on to three and two orifices, respectively, 141b, 141c, and 141d, and 142b, 142c, respectively. On the inner side of the manifold 14, the stub 143 opens on to a circular orifice 143b. Each orifice 131b and 131c, 132b-135b, 141b-141d, 142b, 142c, and 143b has the same diameter as the great apertures 121-123 of the disc and comprises a circumferential recess receiving a sealing packing. This sealing packing comprises an annular sinuous spring 13d, an intermediate steel ring 13e, and a teflon packing ring 13f abutting the disc 12. The sinuous spring ensures that the packing ring is held against the disc 12 at an essentially constant pressure, even if the disc is placed somewhat oblique. The intermediate steel ring 13e ensures that the tops of the waves of the sinuous spring do not make indentations in the teflon ring, thereby ensuring a long time of life for the packing.

The manifold furthermore comprises a central hole 144 receiving the driving shaft (not shown).

Figure 5:
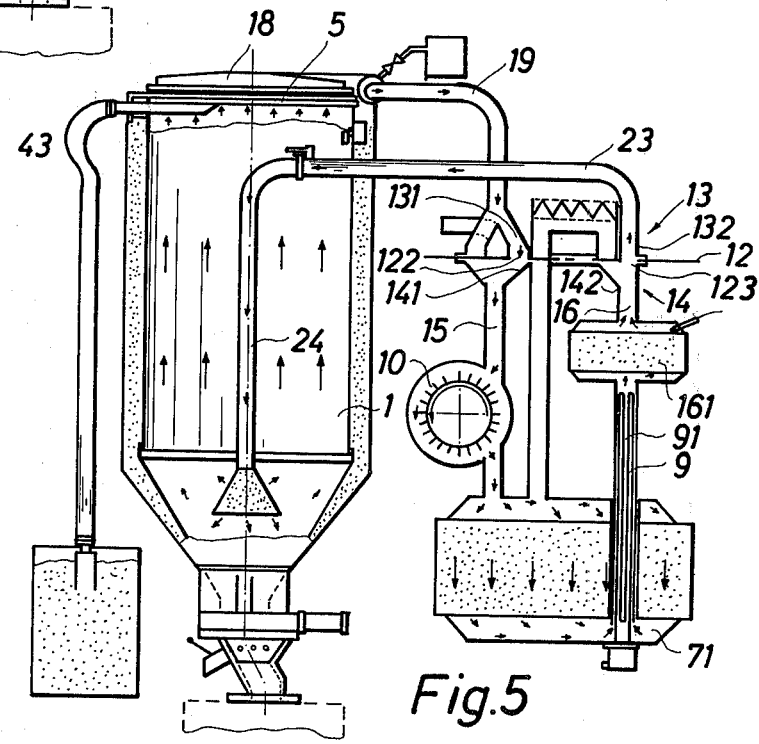
Figure 6:
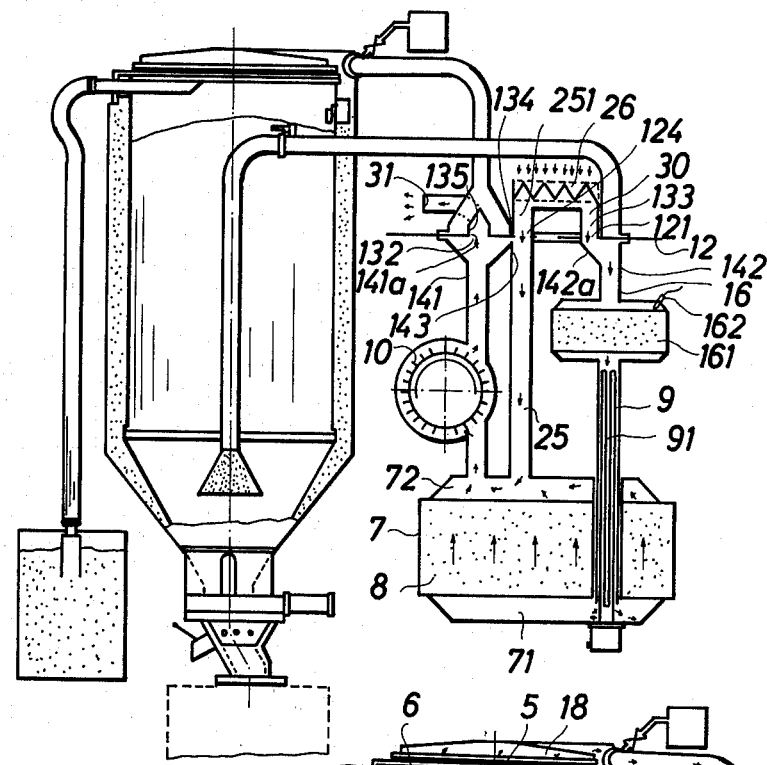
Figure 7:
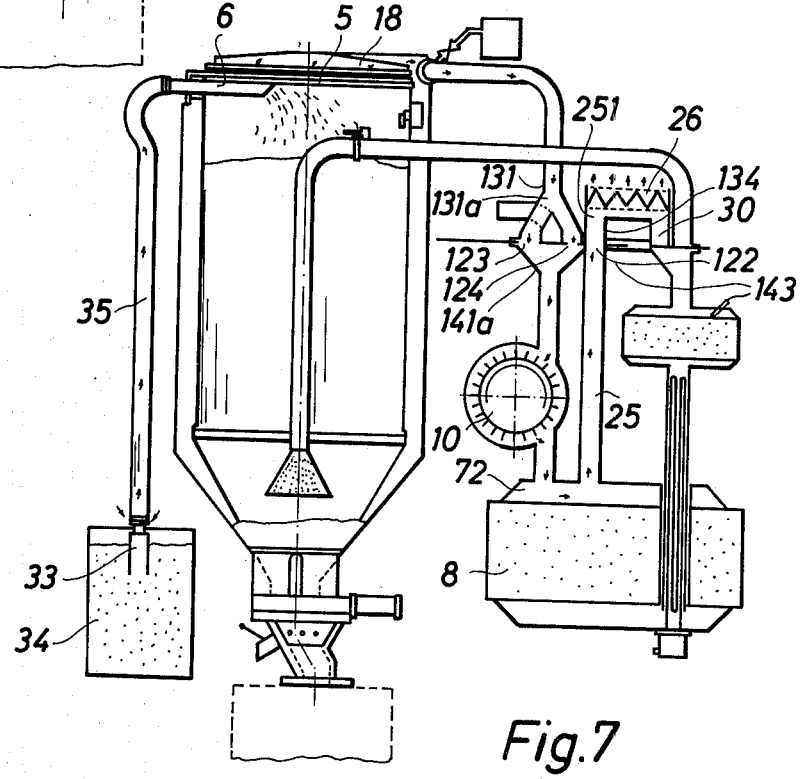

On the first manifold 13:
the stub 131 is secured to one end of a sucking pipe 19, the opposite end of which is connected to the upper chamber 18 above the filter 5 in the lid 4, cf. FIG. 5, one end of a warm air blowing-in pipe 23 is clamped on the stub 132, said pipe 23 being connected through a clamping coupling 231 with a flap valve 232 to a vertical pipe 24 in the container 1, whereby the pipe 24 opens at the bottom of the hopper 2, cf. FIG. 5, one end of a sucking pipe 30, cf. FIG. 7, is clamped on the stub 133, said sucking pipe extending to a filter 26 for sucking in ambient air and in a predetermined position for the valve blowing out air, one end of an upper bypass pipe 251, cf. FIG. 6, is clamped on the stub 134, said bypass pipe also extending to the filter 26, a discharge pipe 31, cf. FIG. 6, for blowing out humid air may be clamped on the stub 135.

On the second manifold 14:
the stub 141 is secured to one end of a first blower pipe 15, cf. FIG. 5, the opposite end of which is connected to the blower 10, the stub 142 is secured to one end of an upper heating pipe 16, cf. FIG. 6, which is connected preferably through an inserted heat accomulator 161 to the lower heating pipe 9, which in turn is connected to a first air chamber 71 in the container 7, and the stub 143 is secured to an upper end of a lower bypass pipe 25, the opposite end of which is connected to a second air chamber 72 in the container 7, cf. FIG. 6.

The cycle of the apparatus is diagrammatically illustrated in FIGS. 4 to 7 and will be described below. Said description is, however, only to be considered a guidance since it from a constructive point of view is not correct. Only the parts essential to the individual sequences are provided with reference numerals in these Figures.

Figure 4:
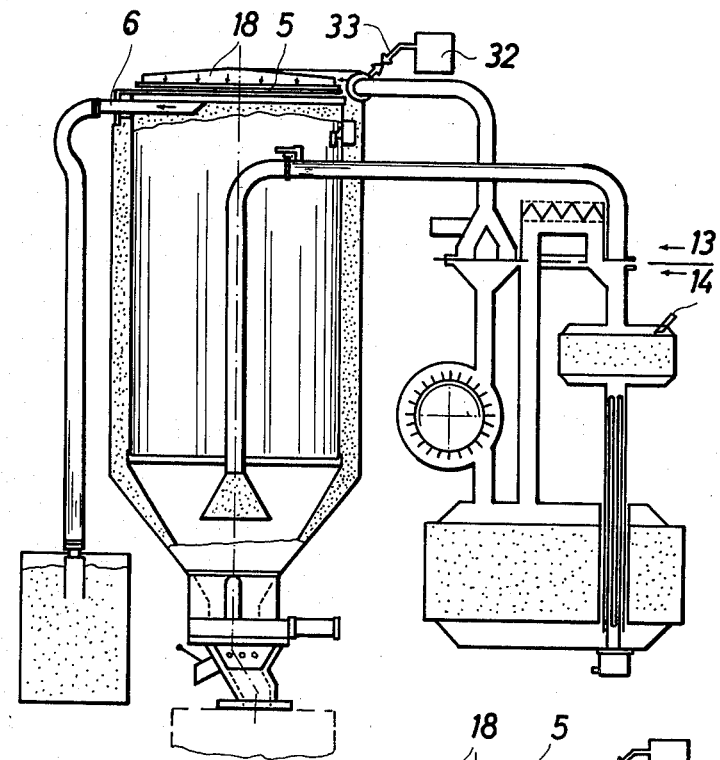
FIG. 4 is a diagrammatic view of the apparatus, showing the position wherein a turntable valve is closed, FIG. 5 corresponds to FIG. 4 illustrating a cycle, wherein the turntable valve according to the invention is positioned for preheating and drying material in a drier for drying plastics, FIG. 6 corresponds to FIG. 4 illustrating a cycle, wherein the turntable valve is positioned for drying or regenerating humidity adsorbing material in an air drier, FIG. 7 corresponds to FIG. 4 illustrating a cycle, but wherein the turntable valve is positioned for sucking the material into the drier for plastics.

FIG. 4 illustrates the valve in a closed position. When the valve is in this position, it is possible from a pressure tank 32 through the pipe 33 to introduce a compressed air blow into the chamber 18 above the filter 5 to clean said filter. The compression blow travels through the pipe 6.

FIG. 5 illustrates the valve with the disc 12 in a second position whereby a closed plastic drying cycle from the blower 10 is created, said blower rotating counter clockwise as indicated by the arrows and blowing air through the adsorbing material 8, through the heating pipe 9, the heat accumulator 161, through the stub 142, the disc aperture 123, the stub 132, the pipes 23, 24, the granulate 43 to be dried, the filter 5, the chamber 18, the sucking pipe 19, the stub 131, the disc aperture 122, the stub 141, and back to the blower through the blowing pipe 15. In this position, dried warm air is thus carried through the granulate material to dry said material, and the warm air is completely dried in the air drier 7 and recirculated with the least possible loss of heat. A thermostat 162 in connection with the heater or preferably the heat accumulator 161 ensures that the air flowing into the container has a constant temperature which is sufficient to cause an efficient drying without damaging the plastics, e.g. 60° to 120° C. depending on the plastic material. At the start of this cycle, the heat accumulator accumulates the heat originating from the below-mentioned regeneration cycle so that no overheated air during the drying cycle is led to the plastic granulate. During the drying cycle the heat accumulator guarantees that the temperature of the air blown through the plastic granulate varies as little as 1° to 2° C., thereby ensuring that the drying temperature is adjusted exactly to the type of plastics being dried. This is highly desirable as the temperature of the air leaving the heating unit 9, 91 may vary as much as 15° C.

FIG. 6 illustrates the valve with the disc 12 in a third position, whereby an open cycle is formed, and whereby the humidity adsorbing material is regenerated. In this case, the blower 10 rotates clockwise as indicated by the arrows. Air is sucked through the filter 26, and a main flow is sucked through the stubs 133, the disc aperture 121, the distributor pipe 142a, the stub 142, through the heat accumulator 161, in which the remaining heat is utilized for preheating the air, the heating pipe 9, in which the air is heated to more than 250° C., preferably about 270° C., through the first air chamber 71, through the adsorbing material 8, the second air chamber 72, in which it is mixed with cold air, sucked in through the filter 26, the stub 134, the small disc aperture 124, the stub 143, and the bypass pipe 25, whereupon the humid air now cooled for protecting the blower is carried through the blower 10 to the stub 141, through the distributor pipe 141a, the disc aperture 132 to the stub 135 and out into the atmosphere, through the discharge pipe 31, if any.

FIG. 7 illustrates the valve with the disc 12 in a fourth position with an open cycle for sucking in the material in the container 1 by providing a low pressure in said container. In this connection the blower 10 rotates counter clockwise as indicated by the arrows. The air is sucked in, which implies that the granulate is carried through a sucking probe 33 from the stock 34 and through a conveyor hose 35 to the inlet pipe 6. From this inlet pipe, air and material flow into the container 1, in which the material is distributed by the distributor cyclone 61, cf. FIG. 1. The air is sucked out through the filter 5, the chamber 18, the sucking pipe 19 to the stub 131, through the distributor pipe 131a, the disc apertures 123 and 124, the distributor pipe 141a, the stub 141, the blower 10, the second air chamber 72, the lower bypass pipe 25 to the stub 143, the disc aperture 122, the stub 134 to the filter 26 to blow out the conveying air. This air thus flows neither through the granulate in the container 1 nor through the adsorbing material 8.

The thus described apparatus constitutes a desiccant dry loader providing a continuous desiccant drier with built-in vacuum conveying system. The apparatus is developed for troublefree drying of plastic granulate, especially.

The desiccant dry loader may be made in six standard sizes, all working with pre-dried air (dew point −35° C.) in a closed loop system offering a high constant performance. The simplified principle of construction has made it possible to combine four functions by means of the special turntable valve securing a certain production with low power consumption and limited space requirements.

The apparatus is designed for hopper mounting and drying of the raw material is carried out by means of recirculated predried air with a dew point of −35° C. corresponding to a final moisture content in the air of 0.012% only.

In order to obtain the above-mentioned dew point of −35° C. the drying air is passing the desiccant bed, which adsorbs the main part of the humidity in the air. By recirculating the drying air from the raw material hopper in a closed loop system, the air which has to be dried only contains a minor amount of humidity which has to be removed and at the same time less energy is required to heat the air which all the time is re-used.

Regeneration of the desiccant bed is carried out in a limited period of time every 60 to 120 minutes (adjustable) by means of air with a very high temperature. In order to avoid variations in the temperature when switching over to raw material drying the air is passing a heat accumulator.

The apparatus differs from previously known hopper driers by the fact that the unit has a built-in automatic vaccum conveyor. Conveyance of the raw material to the drying hopper is controlled by means of a paddle level control 40 in order to ensure that the same amount of raw material is always being dried.

The desiccant dry loader is equipped with an effective insulation 41 covered by a glass fibre cover 42, whereby the loss of heat is reduced to a minimum and a low net weight is achieved.

Although not shown in the Figures, the glass fibre cover also covers the drying hopper as well as the blower and the air drying unit, whereby a noise level of only 65 dba is ensured.

The apparatus is especially developed for drying plastic raw materials requiring a very low final moisture content at processing in order to maintain the original physical qualities such as for instance tensile strength and impact strength. However, the apparatus may also with advantage be used for less demanding materials, thereby minimizing the risk of bubbles, shrinkage or stripes. Furthermore, drying by dry air provides an advantage with respect to capacity compared to ordinary warm air drying.

By means of the apparatus according to the invention, a satisfactory drying of hygroscopic materials such as for instance ABS, PA types, polycarbonate, PMMA, SAN, etc. is obtainable, whereby the final moisture content in the granulate before the processing is of utmost importance to the quality of the final product or the surface finish thereof.

Depending on the time of stay of the material in the drying hopper, the apparatus may reach a final moisture content of 40 ppm corresponding to 0.004%.

The desiccant dry loader is designed for an efficient drying of hygroscopic materials by means of dry air, and because of the high drying capacity, the use of the unit as a preheater depends on the throughput of the material.

A control (not shown) is used for automatic or manual operation of the drier and furthermore for mounting of a start watch.

On a front panel (not shown), all functions may be indicated by means of lamps such as for instance a warning lamp indicating missing material. This panel may furthermore include a signal for a filter change and a faulty heater.

The three active functions built into the apparatus according to the invention, viz. desiccant drying of the raw material, conveying said raw material to the drying hopper, and regenerating the desiccant bed, are all rendered possible by the utilization of the suction side as well as of the pressure side of the blower, combined with change of blower rotation and a turntable valve. Thereby the air may be led in different directions as required.

The apparatus according to the invention operates in the following preset time cycle when in continuous operation:

Conveyance time:
Controlled by a level control
Filter cleaning:
0.5 sec.
Raw material drying:
60 to 120 minutes (adjustable)
Regeneration of the desiccant bed:
15 minutes (incl. 5 minutes after cooling time).

When the rotating paddle on a level sensor 40 in the hopper is able to rotate freely, the turntable valve 11 is then positioned for conveyance and the slide valve 3 is closing.

The blower 10 is sucking air out of the hopper 1 through the filter 5, whereby a vacuum is created in the hopper causing the ambient air to enter the telescopic suction probe 33. This suction probe 33 is situated in a bin or a bag 34 with raw material. The air entering the probe carries along raw material to the hopper, wherein it is equally spread over the surface by means of the cyclone 61.

When the level in the hopper 1 reaches the paddle level sensor 40, the blower 10 stops. The slide valve 3 opens and a cleaning of the filter 5 is carried out by means of compressed air stored in the compression chamber.

The turntable valve 11 is positioned for drying raw material. The blower 10 sucks air from the hopper 7. The air is blown through the desiccant bed 8, past the heater 9, through the heat accumulator 161, into the hopper 1 through the distributor pipe 23. This distributor pipe 23 is by means of the quick release coupling 231 fitted for an easy disconnection. The predried heated air is moving equally up through the raw material in the hopper 1, leaving through the filter 5, and back to the blower 10 in a closed loop system.

The turntable valve 11 is positioned for regeneration of the desiccant bed. The blower 10 has changed its direction of rotation and is now sucking the ambient air in through the air filter 26, the heat accumulator 161, and past the heater 9, wherein it is heated to a very high temperature and subsequently it is sucked further through the desiccant bed 8 regenerating the content of molecular sieve. The air leaving the desiccant bed 8 passes through the blower 10 being blown out.

The three main functions in the raw material handling—drying of raw material with predried air, conveying of raw material to the processing machine as well as regeneration of the desiccant bed—all of which are built into the apparatus according to the invention and they offer facilities as homogeneous drying independent of the weather conditions, better quality products, low power consumption, low construction compared to the usual constellation drier/conveyor. As the apparatus is designed for a hopper mounting, it does not take up floor space usually occupied by desiccant driers. In addition, the apparatus is of a relatively low total height.

Although the apparatus and the valve according to the invention have been described in a specific construction it is obvious to a person skilled in the art that many modifications and alterations may be performed without deviating from the scope of the claims as defined below.

The two manifolds may thus comprise less or more stubs, distributor pipes, and orifices than shown in the drawings, and the orifices may be placed in one, two or several concentric circles being connected in various manners through distributor pipes provided with stubs.

Also the area without holes may be utilized for more holes, or there may be two or several intervals without holes. The exact construction of the valve according to the invention depends on the intended use thereof.

The disc may correspondingly be constructed with less or more apertures. These apertures should correspond to the orifices of the manifolds and be placed with their centres upon one or several concentric circles. Also the size of the aperture or rather the area permitting air to pass through these apertures may be varied so that an air stream originating from the blower may be divided into two or more air streams of various forces.

Although described in connection with a drier for plastics, it is obvious that the apparatus and the valve described may also be employed for many other purposes and for drying other types of material. The valve according to the invention may for instance be used in connection with a convector system for heating buildings in order to direct the flow of heating air according to the need.

We claim:

1. An apparatus for preheating and drying a granulated material, said apparatus comprising: a drier housing adapted to be connected to the material inlet of a plastic processing machine;
   a material inlet opening on said housing, said material inlet opening being adapted to be connected to a source of material to be dried;
   a material discharge opening on said drier housing, said material discharge opening being adapted to be connected to said plastic processing machine;
   a reversible blower;
   a heating means;

a multiport valve positionable in at least three operational positions plus a closed position and adapted to permit air flow in two direction;

an air drier;

a heat accumulator; and conduit means connecting said housing with said blower, said heating means, said air drier and said heat accumulator, via the ports of said valve, whereby a first air flow circuit is formed through said valve, said blower, said air drier, said heating means, said heat accumulator, said valve and said housing when said valve is in a first position and said blower is rotating in a first direction, whereby a second air flow circuit is formed through said valve, said heat accumulator, said heating means, said air drier, said blower and said valve when said valve is in a second position and said blower is rotating in a second direction, and whereby a third air flow circuit is formed through said material inlet opening on said housing, said valve and said blower when said valve is in a third position and said blower is rotating in said first direction.

2. The apparatus of claim 1 wherein said valve comprises:

two manifolds connected to one another to form a chamber;

plural pairs of orifices on said manifolds, each said pair of orifices comprising a first orifice on one of said manifolds and a second orifice on the other of said manifolds and facing said first manifold in an opposing manner;

a rotatable disk in said chamber and including three apertures of the same size as said orifices and one aperture of a smaller size than said orifices, whereby rotation of said disk selectively registers said orifices and apertures to form portions of said circuits.

3. The apparatus of claim 1 wherein said valve, when in said closed position, disconnects said housing from said blower, said heating means, said air drier and heat accumulator, further including an atmospheric port and filter adapted to provide air to said heat accumulator and said air drier in said second circuit, and to exhaust gas from said blower in said third circuit.

4. The apparatus of claim 1 wherein said air drier is a container having one end connected to said blower and a second end connected to said heating means in the form of a vertical pipe, said air drier including a stock of regenerative adsorbing material through which gas can flow in two directions.

* * * * *